(No Model.) 2 Sheets—Sheet 2.
R. J. THOMPSON.
COMBINED PIPE AND NUT WRENCH.
No. 563,519. Patented July 7, 1896.
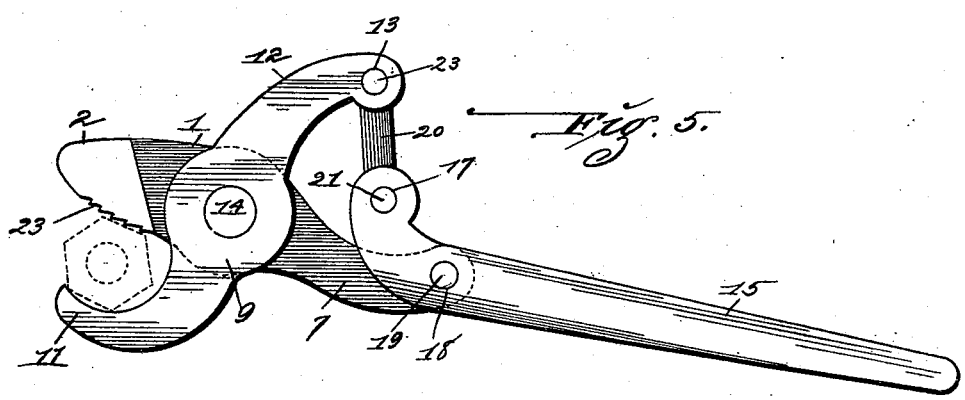
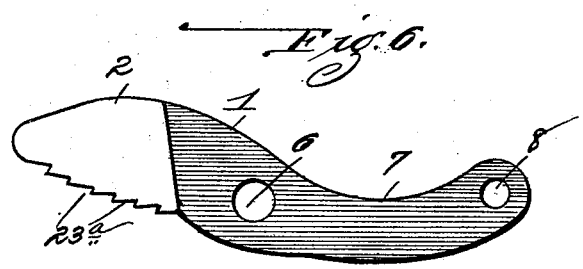
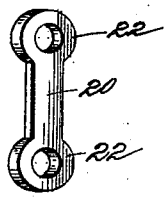
Attest
M. F. Smith
John L. Tunison
Inventor:—
Robert J. Thompson
by Higdon & Higdon & Longan
Attys.

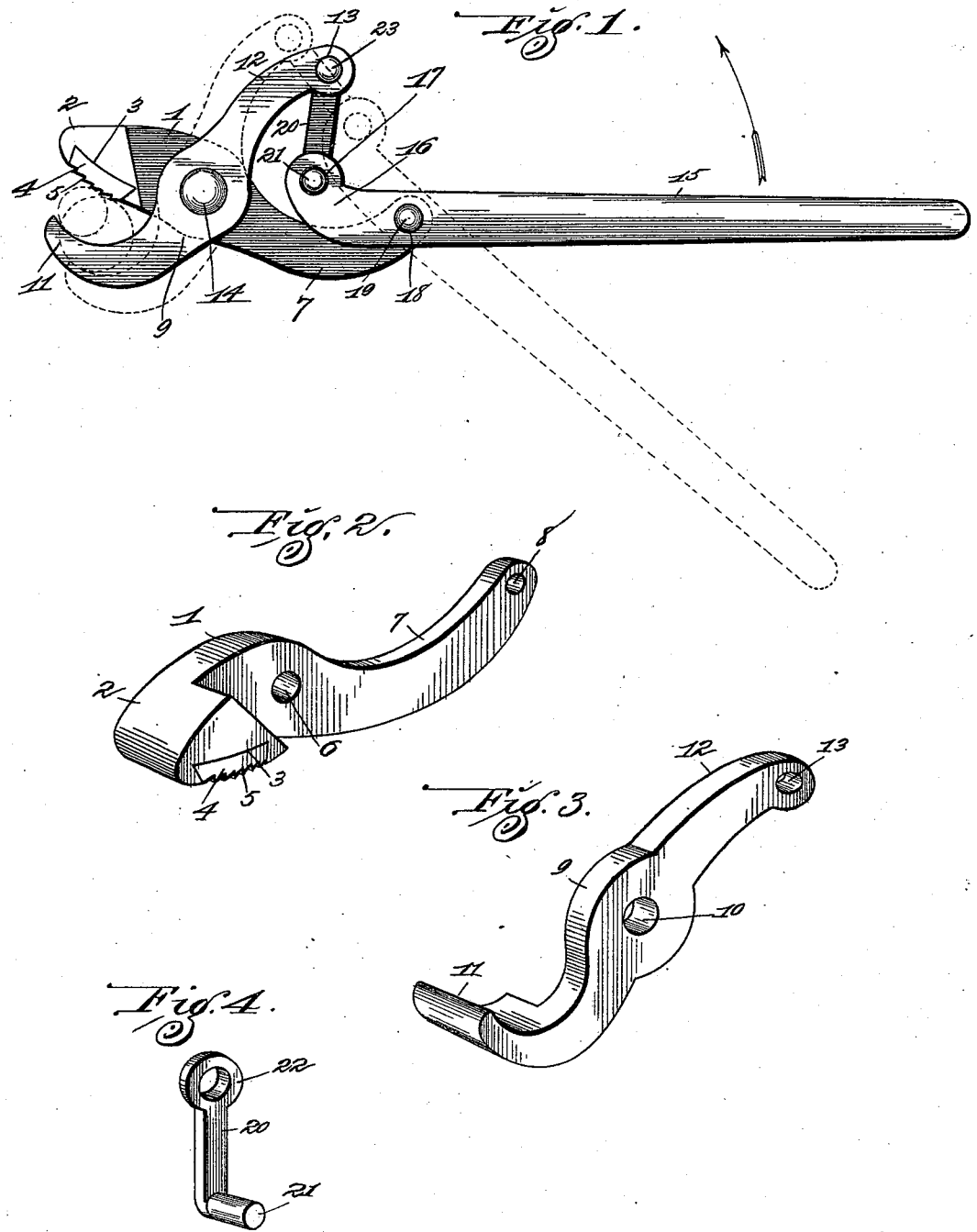

UNITED STATES PATENT OFFICE.

ROBERT JAMES THOMPSON, OF GRANDIN, MISSOURI.

COMBINED PIPE AND NUT WRENCH.

SPECIFICATION forming part of Letters Patent No. 563,519, dated July 7, 1896.

Application filed August 5, 1895. Serial No. 558,253. (No model.)

*To all whom it may concern:*

Be it known that I, ROBERT JAMES THOMPSON, of the city of Grandin, Carter county, State of Missouri, have invented certain new and useful Improvements in a Combined Pipe and Nut Wrench, of which the following is a full, clear, and exact description, reference being had to the accompanying drawings, forming a part hereof.

My object in the present invention is to make a combined pipe and nut wrench that shall be powerful, easy to operate, simple in construction, self-adjustable to different sizes of nuts or pipes, and shall utilize in turning the greatest possible amount of the force applied.

The advantages I claim for my wrench are that the same wrench will fit a square nut, a six or eight cornered nut, and a round shaft or pipe with equal facility and without any preliminary adjustment, and that it is self-adjusting and requires the use of but one hand to operate, and the further advantage that while it has a powerful grip upon the nut, pipe, or shaft the force exerted in gripping contributes to the rotary motion of the nut, pipe, or shaft to be turned.

My invention consists in making a self-adjusting combined pipe and nut wrench having a smooth curved jaw to wrap around the nut or pipe to or past the opposite side from the pivot of the jaws and a toothed jaw to press against the nut or pipe at approximately right angles to a line from the handle passing through the center of the nut or pipe. The lines of force meet and cross at the center of motion at an angle of from thirty or forty degrees. The point of force of the curved jaw is always exerted near its forward end and can never be in a straight line with the center and the point of force of the toothed jaw. The larger the nut or pipe the greater the angle of the lines of force. This accounts for the fact that the force exerted in pinching the nut or pipe also contributes to the rotary motion thereof.

My invention consists, further, in the fact that the jaws are opened by straightening a toggle-joint and are closed by bending the toggle. There is less loss of force by friction and angularity by applying the force in this way for this purpose than there would be if the operation was reversed, *i. e.*, closing the jaws by straightening the toggle.

The novel construction, combination, and arrangement of which my invention consists are hereinafter more fully described and claimed.

In the drawings, Figure 1 is a side elevation of my improved wrench, the dotted lines showing the positions the various parts of said wrench assume when it is opened to its fullest extent. Fig. 2 is a view in perspective of one of the gripping-jaws of my improved wrench. Fig. 3 is a view in perspective of the other gripping-jaw. Fig. 4 is a view in perspective of a link of which I make use in carrying out my invention. Fig. 5 is a side elevation of my improved wrench, the same being shown as gripping a nut. Fig. 6 is a side elevation of a modified form of the gripping-jaw seen in Fig. 2. Fig. 7 is a view in perspective of a modified form of the link of which I make use.

Referring by numerals to the accompanying drawings, 1 indicates the main jaw of my improved wrench, the same being provided with a widened head 2, in the lower face of which is formed a dovetailed recess 3, and in said recess 3 is located a hardened plate 4, the face of which is constructed with a series of corrugations or teeth 5. Passing through the jaw 1 is an aperture 6. Formed integral with and extending rearwardly from the body of the jaw 1 is a curved arm 7, in the extreme rear end of which is formed an aperture 8.

9 indicates the body of the mating gripping-jaw, said body being provided with a transverse aperture 10. Formed integral with and extending forwardly from the body 9 is a curved widened jaw 11, and formed integral with and extending rearwardly from the body 9 of the jaw is an arm 12, in the extreme rear end of which is formed an aperture 13. A bolt or rivet 14 passes through the apertures 6 and 10 of the jaws and pivots or hinges said jaws together.

15 indicates the handle of my improved wrench, the forward end 16 of which is curved upwardly and provided with an aperture 17. Immediately in the rear of this upwardly-curved forward end 16 is an aperture 18. A bolt or pin 19 passes through the apertures 8 and 18, and thus pivotally connects the handle with the rear end of the jaw 1.

20 indicates a bar or link having a laterally-projecting pin 21, formed integral with its lower end, and said pin 21 passes through the aperture 17, formed in the upwardly-turned end 16 of the handle 15. A ring 22 is formed integral with the upper end of the bar or link 20, and a bolt or pin 23 passes through the aperture 13 and through this ring 22, thus connecting and hinging the same together.

When my improved wrench is gripped upon a pipe or the like, said pipe lies directly between the upwardly-turned widened end 11 of the jaw 9 and the toothed or corrugated plate 4, located in the recess 3 in the head of the jaw 1. When the handle 15 of said wrench is moved upwardly or in the direction as indicated by the arrow in Fig. 1, said handle acts as a lever, the fulcrum-point of which is on the pin or bolt 19. The outer end 16 of the handle 15 being connected to the rear end of the jaw 9 by the link 20, said rear end of the jaw 9 will be drawn downwardly and the upturned forward end 11 of said jaw 9 will very firmly engage the pipe against the toothed face of the plate 4. With this same upward movement of the handle 15, the rear end of the jaw 1 will be drawn upwardly, said jaw being pivoted or hinged on the pin or bolt 14 and said movement will necessarily throw the forward end or head 2 of the jaw 1 downwardly and cause the plate 4, carried thereby, to very rigidly grip and engage against the pipe or nut.

It will be seen by reference to Fig. 1 how, when the handle 15 is moved to cause the jaws to clamp or grip upon a pipe or nut, the forward end thereof moves nearer the pin or bolt 14, hinging the two jaws together. Consequently the power applied to the outer end of the handle 15 is greatly increased as it is transferred to the gripping portions of the jaws.

The recess 3 is formed in the head 2 of the jaw 1 in order that interchangeable plates provided with different-sized teeth may be located in said recess when it is desired to use the wrench for different kinds of work. In some instances the recess 3 and toothed plate 4 are dispensed with and a series of teeth 23ª are formed directly on the under side of the gripping-face of the head 2 of the jaw 1.

In some forms of the wrench I find it desirable to form a ring at both ends of the link 20, and in so doing the pin 21 is of course dispensed with.

A wrench of my improved construction may be used for all classes of work where an ordinary wrench is used, is self-adjusting, simple, strong, and durable, easily manipulated, and is very efficient in use.

I claim—

In a combined pipe and nut wrench, the jaw 1 having the arm 7 and the corrugated removable face-plate 4, in combination with the smooth curved jaw 11 having the arm 12, the bolt 14 pivoting the jaws together, the lever 15 and 16, the bolt 19, connecting the lever to the corrugated jaw, the link 20 having the pin 21 for insertion in the aperture 17, and the bolt 23 connecting the link 20 to the arm of the curved jaw, thus forming a toggle between the rear end of the said arm, the bending of which operates the jaws of the wrench.

In testimony whereof I affix my signature in presence of two witnesses.

ROBERT JAMES THOMPSON.

Witnesses:
JOHN McDERMOTT,
T. P. EPPERSON.